Oct. 6, 1959     S. MEURER ET AL     2,907,308

OPERATION OF INTERNAL COMBUSTION ENGINES

Filed Jan. 7, 1955     7 Sheets-Sheet 1

INVENTORS
Siegfried Meurer
Hermann Seegelken
BY
Bailey, Stephens & Huettig
ATTORNEYS

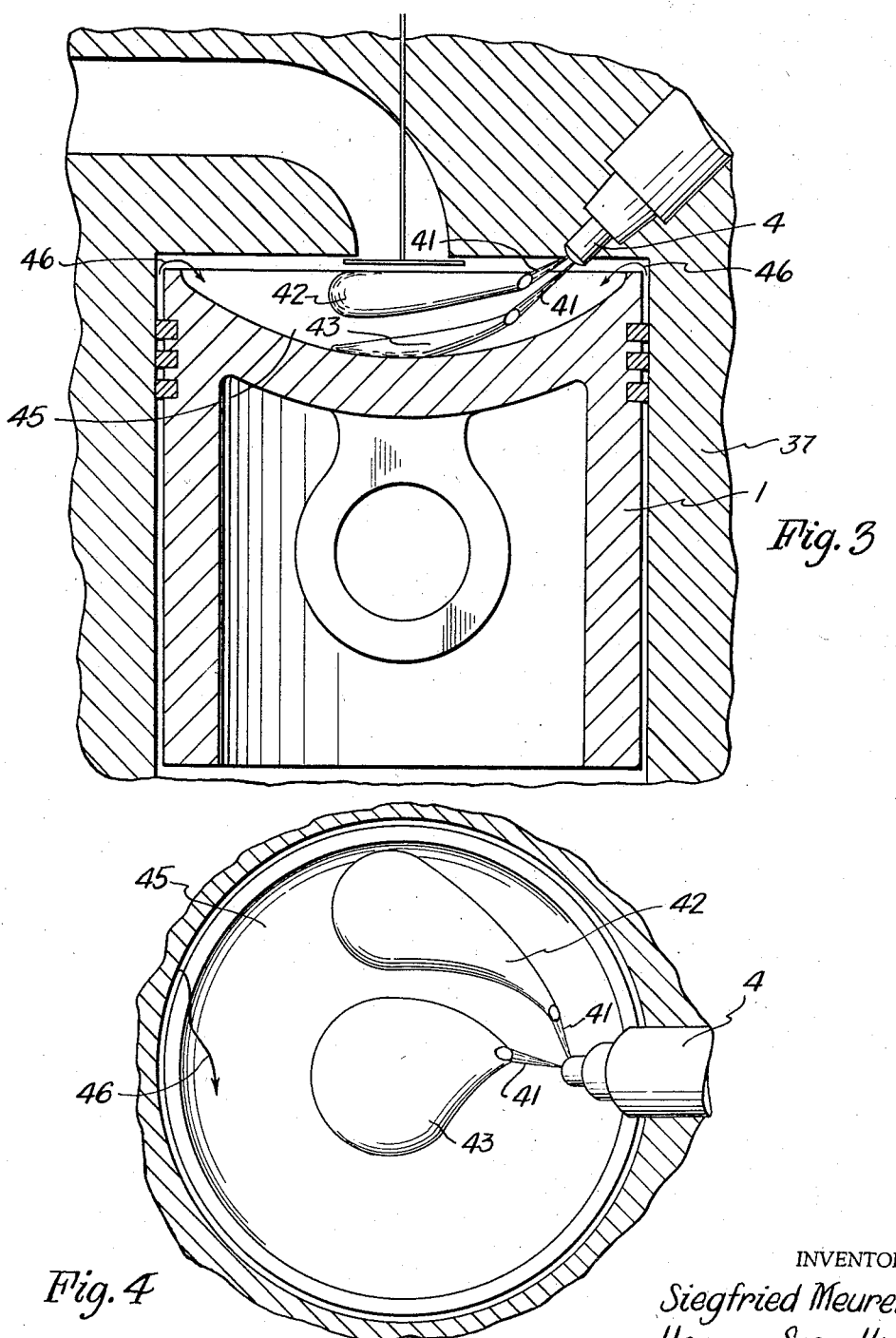

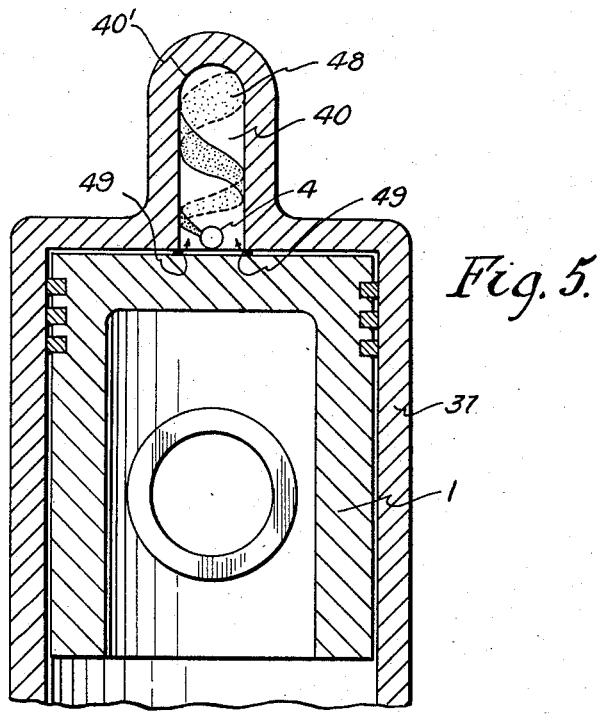

Oct. 6, 1959     S. MEURER ET AL     2,907,308
OPERATION OF INTERNAL COMBUSTION ENGINES
Filed Jan. 7, 1955     7 Sheets-Sheet 4

INVENTORS
Siegfried Meurer
Hermann Seegelken
BY
Bailey, Stephens & Huetig
ATTORNEYS INVENTOR
Siegfried Meurer
Hermann Seegelken
BY
ATTORNEYS United States Patent Office 2,907,308
Patented Oct. 6, 1959

2,907,308
OPERATION OF INTERNAL COMBUSTION ENGINES

Siegfried Meurer and Hermann Seegelken, Nurnberg, Germany

Application January 7, 1955, Serial No. 480,432

Claims priority, application Germany December 17, 1951

27 Claims. (Cl. 123—32)

This invention relates to an improved method of operating an internal combustion engine, and to an internal combustion engine operated according to this method.

An object of the invention is to produce an internal combustion engine having a high mean pressure.

Another object of the invention is to provide for fuel injection engines a method and construction ensuring low specific fuel consumption.

A special object of the invention is to provide a method of injecting the fuel to obtain a relatively slow yet complete combustion of the fuel.

Still another object of the invention is to provide a method of fuel injection by which decomposition of the fuel in the course of the combustion is largely avoided.

A further object of the invention is to provide a method and construction resulting in a smoothly running diesel engine, and which avoids the hard diesel knock with its inherent high losses and wear.

A still further object of the invention is to produce a combustion process and engine which are not sensitive to the quality of the fuel, and can operate with widely different fuels.

With these and other objects in view, this invention consists in the method steps, details of construction, combination of elements and operation hereinafter set forth and then specifically designated by the claims.

The means by which the objects of the invention are obtained are described more fully with reference to the accompanying drawings, in which:

Fig. 3 is a fragmentary diagrammatic longitudinal sectional view of a modified cylinder and piston;

Fig. 4 is a plan view of the piston head shown in Fig. 3 and showing the position of the fuel nozzle;

Fig. 5 is a fragmentary diagrammatic longitudinal sectional view of a further modification;

Fig. 21 is a comparison table.

Similar reference numerals denote similar parts in the different views.

Figure 1:
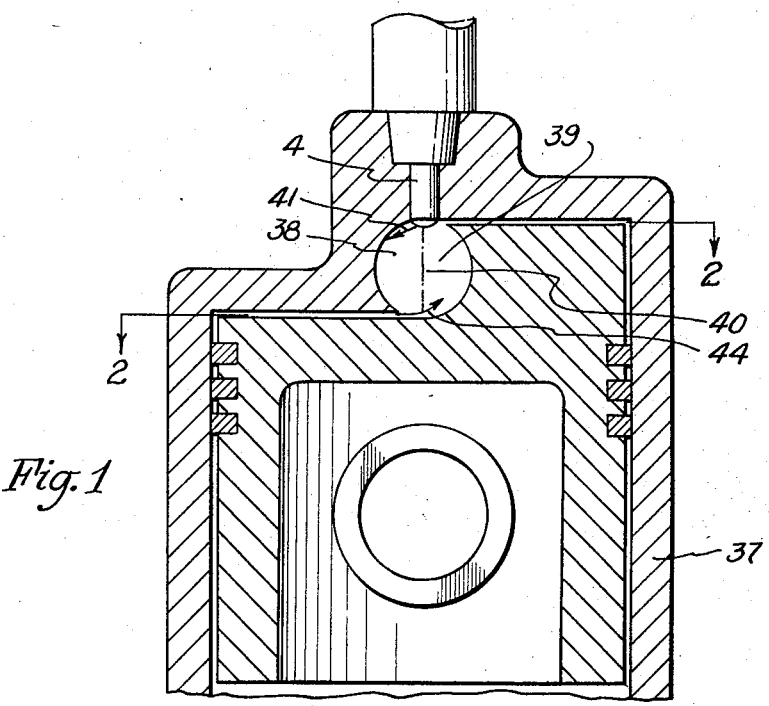
Fig. 1 is a fragmentary diagrammatic longitudinal sectional view of a cylinder and piston of a diesel engine according to the invention.

In order that the invention and its various aspects may be fully understood by those skilled in the art, it is opportune to give at first a brief discussion of the physical and chemical phenomena occurring during the ignition and combustion of the fuel in a diesel engine.

When the liquid fuel is injected into the hot compressed air of a diesel engine, two physical processes are taking place simultaneously. One process is that of the dispersion, that is the physical mixture of the liquid fuel with the air. This process is supported in modern diesel engines by the shape of the combustion chamber or by a motion given to the air in such a way that in the brief interval available a sufficient dispersion of the atomized fuel, all still in the liquid state, takes place in the air present in the combustion chamber. However, this does not produce a mixture on a molecular scale. In addition to the first mechanical process of dispersion, a second process of vaporization and diffusion occurs by the heating of the finely atomized fuel which supports the formation of the mixture and produces a further distribution of the fuel in the surrounding air for combustion. This latter process is also too slow to complete a mixture on a molecular scale, even to a small degree. Therefore, when ignition takes place, all states of the fuel can be found in the diesel engine: both the liquid phase and the vapor phase, the latter in the wet and in the superheated state. A heterogeneous reaction is therefor unavoidable, in contradistinction to the homogeneous reaction of a mixture of gas and air when the mixture is on a molecular scale. But this difference is decisive for the nature of the reactions effected by the temperature. The more homogeneous the mixture is, the more its reaction will be accelerated by the temperature. These purely physical processes are taking place partly during the ignition delay and partly also during the actual process of combustion. An acceleration by a higher temperature occurs at first only to a comparatively moderate degree. It is therefore not possible to shorten substantially the duration of the physical processes by increasing the temperature.

Parallel to the physical processes mentioned above, chemical changes are also taking place in the injected fuel. These chemical changes are due to the fact that the fuel is strongly heated by the air in the combustion chamber. The fact is that the temperature of the air in the combustion chamber is well above the ignition temperature of the liquid fuel or of the vapor in nascent state formed from the fuel. But now, before a reaction can take place with the oxygen of the air, a certain time interval passes, which is called the ignition delay. This time interval is too short for surrounding the fuel molecules with sufficient oxygen molecules to support combustion. Instead of combustion, the molecular structure will decompose into various fragments, whose properties are quite different from those of the original fuel. On the other hand, this process of decomposition is desirable for the initial phases of the ignition, because the decomposition of the fuel molecule creates favorable conditions for its reaction with oxygen.

The chemical processes outlined here, whose details are actually more complex, are much accelerated by the temperature, in contradistinction to the physical processes. For example, if the temperature is increased from 400° to 700° C., the speed of the reaction is increased one hundred times. The temperature rise due to the beginning of combustion in the chamber is, however, much greater than the temperature rise mentioned above, so that the speed of the chemical processes depends to the greatest extent on the temperature. The result is that at high temperatures only the ignition delay due to the physical processes is of any importance for the total ignition delay, while at low temperatures the ignition delay determined by the chemical processes is of decisive importance.

This has now the following effect on the working process of an engine: the course of the chemical reactions in the temperature range occurring in internal combustion engines is substantially faster than that of the physical processes. As a result, the fuel is subject to a chemical decomposition before sufficient oxygen for a complete reaction can be brought into the neighborhood of the fuel molecule by the physical mixing process. However, the decomposition processes which are now taking place create continuously an increasing quantity of molecular fragments which are well prepared for the reaction and react immediately when they make contact with oxygen, so that as a result the process of combustion according to the diesel cycle has the characteristic feature of a very high initial rate of combustion, with the consequence of a sudden increase of the pressure in the combustion space. Furthermore, the course of the chemical processes involve a dehydrogenation of the fuel molecule as a consequence of the decomposition and of the heterogeneous state of the mixture. The dehydrogenation is due to the fact that the few oxygen molecules available attract mainly the hydrogen, so that at first only the hydrogen reacts and thus molecules with an increasing carbon content remain, whose combustion proceeds at a substantially slower rate than that of the original fuel. Because of the formation of slowly reacting dehydrogenated molecules, a good efficiency cannot be reached in a diesel engine unless one takes advantage of the initial high rate of combustion.

A method of this type can be carried out most easily in direct injection engines, but in such case a considerable combustion noise, high combustion pressures, and high mechanical losses are unavoidable. Other methods of operation of diesel engines, for example those where an antechamber is employed, permit the rate of the initial reaction to be reduced by retaining the injected fuel in the antechamber so that the sudden explosive rise in pressure at the commencement of the combustion can be avoided. But the thermal efficiency of these engines is lower, because the entire process of combustion takes some time, so that an acceleration of the process of combustion toward the end of the combustion period cannot be achieved even if considerable mixing takes place. The reason is that due to the decomposition of the fuel caused by the high temperature and the resultant dehydrogenation process, molecules which are inherently more sluggish in their reactions are created and react only slowly if sufficient oxygen is present.

It follows that the high temperature at the end of the compression stroke in a diesel engine causes this undesirable course, but on the other hand precisely this high temperature is necessary to ensure the self-ignition of the fuel.

The present invention now proposes a new method of operation of internal combustion engines and comprises the following steps for engines with compression ignition:

(A) The injection of the liquid fuel into the cylinder begins near the end of the compression stroke, i.e. 25° to 5° before top center;

(B) A considerable portion of the injected fuel, but not more than 98%, is introduced into the combustion chamber in such a way that the temperature of the liquid fuel during the vaporizing process is lower than the temperature at which substantial molecular changes in the fuel occur. Specifically, this fuel is applied immediately to the wall of the combustion chamber, whose temperature is kept at such a level that the temperature of the fuel applied thereon is below the temperature of thermal decomposition but, in general, approximately within the boiling range of the fuel, while the remainder of the fuel is immediately atomized and mixed with the air. By way of alternative, the major portion of the fuel may be introduced in the form of an emulsified binary mixture, e.g., of 70% by weight of the fuel with 30% of water, methanol, or another inert component whose evaporating heat will keep the fuel at a low temperature;

(C) That part of the fuel mentioned first under paragraph B is applied to the wall of the combustion chamber in the form of such a thin film that even the surface of the fuel film facing the hot gases cannot reach a temperature beyond the above-mentioned upper limit owing to the cooling effect of the wall;

(D) The compression ratio is so chosen that the self-ignition of the portion of the fuel injected and atomized in the air takes place positively, while the liquid fuel protected against overheating, more particularly by application to the wall of the combustion chamber and subsequent vaporization, is not ignited directly;

(E) The air for combustion is swept with a swirling motion over the areas on the wall of the combustion chamber where the fuel is applied, in such a way that the vapor generated from the fuel film is entrained by the combustion air and mixed therewith, and the mixture is subsequently ignited by the initial self-ignition of the minor portion of the fuel previously dispersed and atomized in the air.

This new method avoids the difficulties suffered by the diesel cycle hitherto, and which have caused in the economical direct injection engine a hard combustion noise with considerable pressure rises.

Inasmuch as the fuel film is protected from excessive heating before it is vaporized off the combustion chamber wall, the bulk of the fuel avoids preliminary reactions and decomposition which would be the fate of droplets suspended in highly heated air during ignition delay and the initial phase of the combustion. The fuel vaporizing from the wall of the combustion chamber has therefor the same molecular structure as the liquid fuel originally injected. Owing to the fact that the fuel is in contact with the wall, the rate of vaporization is much less influenced by the strongly varying temperature in the mass of gas than would be the case for fuel suspended in droplet form in the mass of gas. The vaporization takes place practically isothermally within the range of temperatures controlled by the temperature of the wall, that is to say, that in unit time only that quantity of fuel can participate in the mixing and combustion process which has taken up sufficient heat for vaporization. Although therefore the entire quantity of fuel is in the combustion space, within any interval of time only the small portion of the fuel which is in the vaporized state can participate in the reaction. If now preliminary reactions are taking place in that portion of the fuel which has been vaporized during the interval of time under consideration, these reactions refer only to small incremental portions of the total quantity. The type of reaction process which encompasses the total fuel in the conventional diesel engine and causes the high initial reaction and slow after-burning phenomena, is confined here to small separate fuel portions which successively repeat the process. The accelerating factors due to the preliminary reaction exist therefore at the end of this chain-like combustion process as well as at its beginning. One obtains therefore a uniform speed of combustion, where the complete process can be controlled by the speed of vaporization which in turn can be controlled in part by adjustment of the wall temperature.

In addition, the following effect takes place. Due to the application of the fuel to the wall of the combustion space, the fuel is protected against excessive heating, as though it were "cooled." The vaporizing process, which in each moment extends only over a portion of the total quantity, produces a mixture of fuel vapor and air, whose ignition characteristic is such that it cannot be ignited immediately by the final compression temperature, in contradistinction to the fuel sprayed into the air heated far above its ignition temperature as in conventional diesel engines.

Probably this discrepancy between the ignition points of the vapor of the fuel atomized in the air and that of the vapor from the fuel on the wall is a consequence of the state of the fuel vapor. The heat entering a suspended droplet functions at first only to surround the droplet with wet vapor, because the process of vaporization requires so much heat that not enough heat is available to superheat the resulting fuel vapor fast enough before the reaction commences.

However, in the case where the fuel is spread on the wall, the fuel takes the heat required for vaporization partly from the wall of the combustion chamber, and since always only a part of the fuel can mix with the total quantity of air present in the combustion chamber, a mixture of superheated fuel vapor and air is formed by the mixing process with the air for combustion before the reaction commences and the ignition point of said mixture is much higher than that of the previously mentioned wet vapor mixture which, as is known, has the same ignition point as the liquid fuel. This fact forces the preliminary reaction to take an entirely different course and results on the other hand in an important characteristic feature of a compression ignition engine operated by means of the method according to the present invention. This has been demonstrated by the fact that the ignition of the fuel ceases whenever the portion of the fuel atomized in the air is omitted and all of the fuel is spread over the wall.

If the ignition is initiated according to the present invention by self-ignition of a minor portion of the fuel distributed and atomized in the compressed air, it can be seen immediately that economy, combustion noise, firing pressures, and exhaust discoloration are improved. The degree of improvement is increased as the atomized portion of the fuel is decreased. However, it is clear that it is not feasible to distribute 100% of the fuel on the wall, and furthermore, there would be no self-ignition, since the fuel would remain on the wall at a temperature which is so low that the processes of decomposition and the preliminary reactions cannot take place at a sufficiently high rate.

The advantages obtained from the new method of operation are a quiet knock-free combustion process, very economical operation and the completion of the combustion in good time, in spite of the low speed of reaction in the initial stages, insensitivity to the quality of the fuel and a very good utilization of the air and very slight discoloration of the exhaust gas, particularly when the engine is operating at part load.

Figure 2:
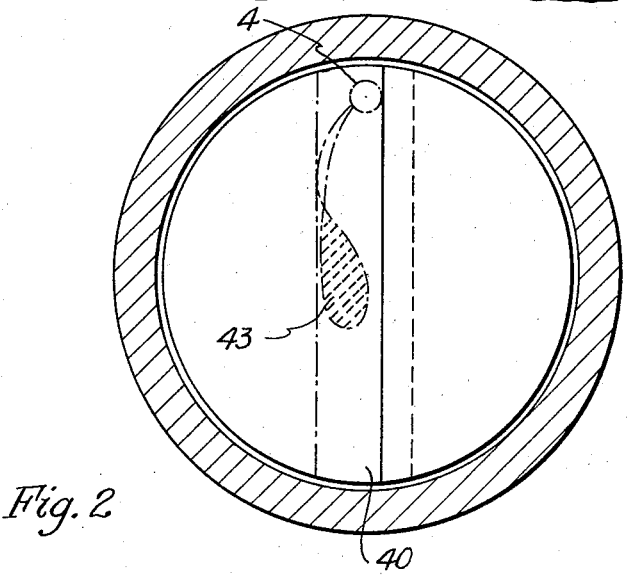
Fig. 2 is a cross-sectional view on the line 2—2 of Fig. 1.

Figs. 1 and 2 show a piston 1 in a cylinder 37 forming together with the piston, by complementary recesses 38, 39, a cylindrical combustion chamber 40 into which the fuel jet 41 is injected in a nearly tangential direction, through a nozzle 4, so as to be applied to the wall of the combustion chamber in the form of a fuel film 42 from which vaporized fuel is mixed by the air 44 entering into the combustion chamber in the direction of the arrow.

Figs. 3 and 4 show a shallow, cup-shaped combustion chamber 45 from which the fuel films 42, 43 applied by the nozzle 4 injecting fuel jets 41 are vaporized and mixed with the air flowing over the fuel films in the direction of arrows 46.

According to Fig. 5, the combustion chamber 40 is formed as a cylindrical cavity terminating in a hemispherical portion 40'. The fuel is injected through a nozzle 4 in such a direction that it is applied on the wall of the combustion chamber in the form of a helically curved film 48 which is vaporized and mixed with air entering in the direction of arrows 49. This air has a strong swirling motion around the vertical axis of cylindrical cavity 40.

Figure 6:
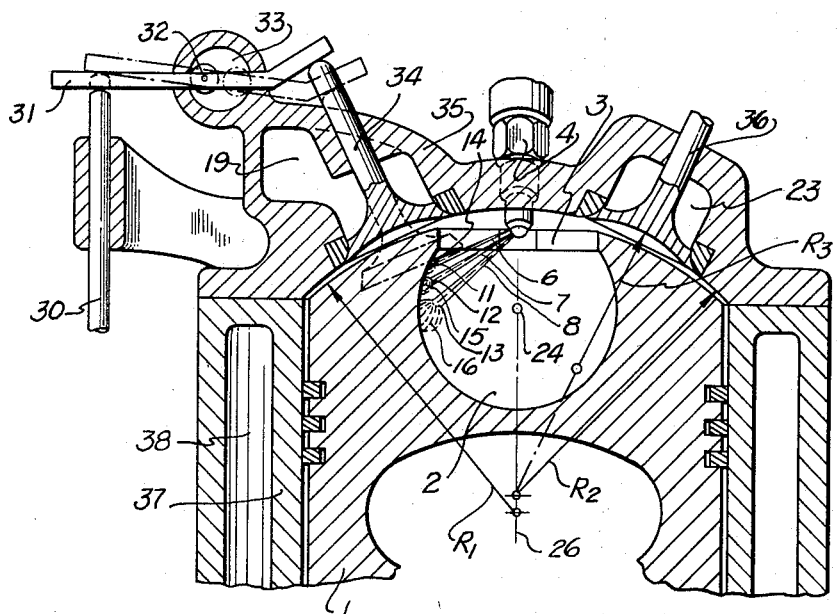
Fig. 6 is a sectional view through another cylinder and piston arrangement having a convex piston head and inclined valves, as viewed toward the rearwardly inclined fuel nozzle and shown injecting three fuel jets.

In a diesel engine having a bowl-shaped combustion chamber located in the piston head as in Fig. 6, the fuel may be injected as several compact jets in a fan-like form upon a surface in an inclined direction conforming at least approximately to the direction of rotation of the air, and the combustion air is given a motion around the axis of the cylinder parallel to the direction of flow of the fuel jets, whereby an immediate mixing of the fuel with the air for combustion is avoided. Contrary to the conventional aim of attaining an immediate intimate mixing of the fuel with the air for combustion, the direction of the jets according to this invention applies the fuel to the wall of the combustion chamber without rebounding so that it is distributed over the wall of the combustion chamber in the form of a thin film. Said thin film, spread over a large surface, is vaporized from the wall of the combustion chamber and mixed with the air-flow, and only during this phase is the vaporized fuel portion burned, whereby a quiet run and yet a low specific fuel consumption is obtained.

In conventional diesel engines where the nozzle was intended to atomize all the fuel, the movement of the air served only to achieve an additional mixing of the atomized fuel with the air. In the system according to the present invention, on the contrary complete atomizing of the fuel by the nozzle is dispensed with and this is possible because only short paths of the jet of fuel are provided up to its impinging on the wall of the combustion chamber. Thus the nozzle must be discounted as a factor in the formation of the mixture and this has to be compensated by activation of the movement of the air, in order that discoloration of the exhaust gas and after-burning are avoided. Therefore, according to the invention, effective measures are taken to produce a rotation of the air during its admission into the cylinder. To this end, an intake channel directed towards the intake valve in the form of a spiral is provided to produce the rotary motion of the charge of air in the cylinder.

As shown in Fig. 6, the intake valve is eccentrically arranged and has an oblique position in relation to the axis of the cylinder, and the stroke of the intake valve can be increased beyond the amount required for opening the full passage cross-section of the valve. The combustion chamber is advantageously constructed in a spherical form or slightly flattened, and the opening of the spherical cavity towards the engine cylinder is formed by a cylindrical neck whose cross-section is about 65% of the maximum cross-section of the combustion chamber and whose height is 15 to 30% of the radius of the combustion chamber in the direction of the longitudinal axis of the piston. The root of the jet, i.e., the point where the jet leaves the bore of the nozzle, is disposed about 2 to 4 mm. lower than the upper edge or rim of the cylindrical neck of the combustion chamber. If desired, the piston head, the cylinder head, and the valves may be arched each with a different radius in order that the air passage resistance of the rotating air flow is reduced as much as possible; it is also possible, for example, in case of an arched or convex cylinder head to arrange the valves in pockets and to provide valve heads which are spherically recessed so as to be flush with the curvature or vault of the cylinder head.

The longitudinal axis of the combustion chamber which in most instances is identical with the axis of symmetry of the same, may coincide with the axis of the cylinder or piston. In some cases, however, advantages are obtained by arranging the axis of the combustion chamber so that it is displaced parallel relative to the axis of the cylinder by a distance "$a$" (Fig. 14) or forms an angle $\beta$ therewith (Fig. 11), or both. The size of the angle $\beta$ or the parallel displacement "$a$" relative to the axis of the cylinder is advantageously selected so that the fuel jet at the edge of the opening of the combustion chamber is freely admitted to the wall of the combustion chamber, without necessitating an incision or channel in the edge of the opening. The non-interrupted edge of the chamber which is rendered possible by the said measure serves to reduce the resistance to flow of the air at the edge of the combustion chamber and at the nozzle. Moreover, it is not necessary to locate the tip of the nozzle too close to the axis of the cylinder which would cause constructional difficulties.

In order to force the air displaced from the cylinder space into a compact stream directed into the combustion chamber of the piston and towards the surface of its wall wetted with fuel, a channel is provided at the top of the piston which issues into the combustion chamber in the vicinity of the injection nozzle in the direction of rotation of the air. This channel confines a part of the air flowing into the combustion chamber and spreads the fuel so that the wetting with fuel of a large surface of the wall of the combustion chamber is assisted in combination with the rotation of the air. Simultaneously this air current is directed towards the part of the wall of the combustion chamber which is covered with fuel, whereby fresh air is continuously fed at high velocity to the fuel film on the wall of the combustion chamber during the admission of air and an adequate vaporization of the fuel is effected. In order to intensify this air current directed to the fuel jet and to the fuel film on the wall, the combustion chamber may moreover be arranged eccentrically to the axis of the cylinder, the admission channel preferably issuing into the combustion chamber on the side farther from the axis of the cylinder.

As shown by experience, the formation of the fuel and air mixture takes place not only as the air flows into, but also as it is flowing out of the combustion chamber. Therefore, the issuing mixture of fuel and air should be guided in such a way that it sweeps preferably over the zones where the fuel impinges on the wall of the combustion chamber. To this end, one or more channels are provided at the mouth of the combustion chamber, whose axes coincide with the direction of flowing-out of the fuel and air mixture and which are displaced relatively to the zones of impinging of the fuel in the direction of flow of the fuel-air gases. The gases rising from the latter are directly washed away through the channel or channels.

The spherical combustion chamber, in effect, forms a concave surface by which rebounding of the fuel from the wall is avoided. The angle at which the fuel jets impinge on the wall is made as small as possible. Thus it is achieved that the fuel jets are directed onto the wall almost tangentially. In order to enlarge the surface of impact, it is advisable to produce several fuel jets each intended to wet a well-defined zone in such a way that the wetted surfaces do not overlap. By the use of several fuel jets and the acute angle of impact, it is ensured that the fuel jets will contact the wall after travelling over only a short path. During this short path the fuel jet remains sufficiently compact so that immediate atomization in the air is minimized.

It is emphasized that the conventional aim of dispersing the fuel sprays over the largest possible volume of the combustion chamber is abandoned according to the present invention.

The general arrangement of a practical embodiment is shown in Fig. 6. A piston 1 of which only the head part is shown reciprocates in a cylinder 37 with cooling jacket 38, which cylinder 37 is closed by a cylinder head 35 accommodating an intake valve 34 shutting off the intake channel 19 and an exhause valve 36 shutting off the exhaust channel 23, both in such a position that the valves 34 and 36 are directed obliquely to the axis 26 of the cylinder 37. Push rod 30 actuates a rocker arm 31 fulcrumed on an adjustable eccentric 33, for actuation of the intake valve 34. The effective transmission ratio or leverage of lever 31 and so the stroke of the intake valve 34 can be changed by rotation of the eccentric 33. In the position of the eccentric 33 and the lever 31 as shown in dashed and dotted lines, the lift of the valve 34 has been increased beyond the measure normally required for fully opening the valve passage (position of lever 31 shown in full lines).

The end face of the piston head 1, the inner face of the cylinder cover 35 and the face of the valve heads of valves 34 and 36 are arched according to different radii, as shown, $R_1$ being the radius of curvature of the piston head, $R_2$ that of the cylinder head and $R_3$ that of the valve heads.

Figure 7:
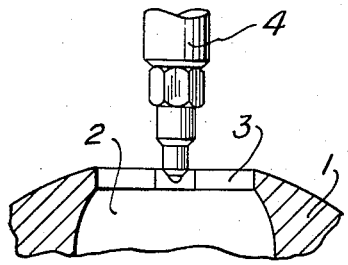
Fig. 7 is a partial sectional view of a simpler embodiment of Fig. 6, and including a nozzle directed parallel to the axis of the cylinder.
Figure 8:
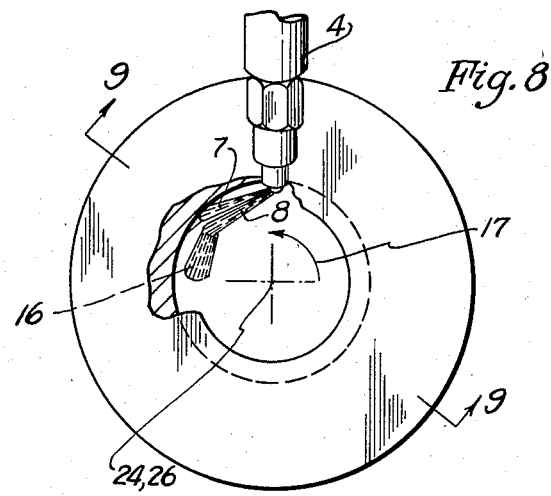
Fig. 8 is a top plan view of the piston head of Fig. 6, with the cylinder head removed and a part of the piston head cut away and showing the nozzle and the position of the second and third fuel jets.

The convex piston head 1 contains a combustion chamber 2 generated by rotation of a curve, which is connected to the working space within the cylinder 37 through a short cylindrical neck 3 and whose longitudinal axis 24 coincides with the cylinder axis 26. The nozzle 4 is arranged in the cylinder head or cover 35 in a slanting direction. By way of alternative, the nozzle may be arranged parallel to the axis of the cylinder, in the manner as shown in Fig. 7, provided that the position of the fuel jet relative to the wall of the combustion chamber is retained, In Fig. 6, the fuel jets 6, 7 and 8 impinge upon the wall of the combustion chamber at the spots 11, 12, 13 so that films 14, 15 and 16 are formed on the wall of the combustion chamber. In Fig. 8, the plane of the cross-section intersects with the fuel jet 7. The flat or nearly tangential impinging of the jet 7 and the formation of the film 15 or of the film 16, originating from the fuel jet 8, is clearly shown. The air in this case is moved in the direction of arrow 17.

Figure 9:
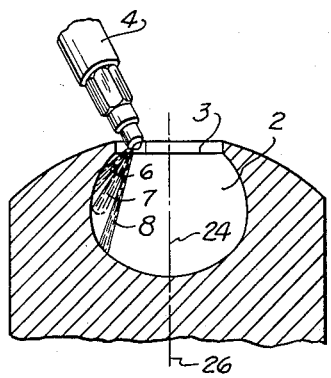
Fig. 9 is an axial sectional view on the line 9—9 of Fig. 8.

According to Fig. 9, the combustion chamber 2 is flattened or depressed compared to an exact spherical shape.

Figure 10:
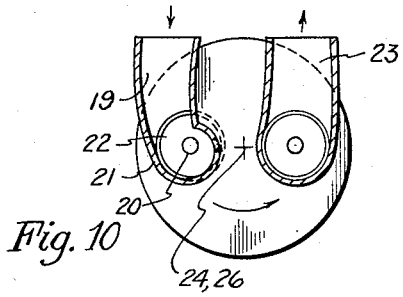
Fig. 10 is a fragmentary cross-sectional view through a cylinder head with a spiral-shaped intake channel and straight exhaust channel.

Fig. 10 shows in plan the form of the intake channel system in case of a four stroke engine. The intake channel 19 is non-symmetrically arranged in relation to the valve stem 20. Its outer wall 21 is formed as a spiral line. By this form of channel, the air for combustion fed to the valve 22 is given a rotary motion continuing into the cylinder on passage of the air through the valve 22. The exhaust channel 23 is straight. The energy of rotation of the air can be varied by changing the stroke of the valve body 22 corresponding to a definite angular position of the crank. Such a change can be effectuated by known means, e.g., by mounting the rocker arm 31 on an eccentric 33, in the manner as shown in Fig. 6.

Figure 11:
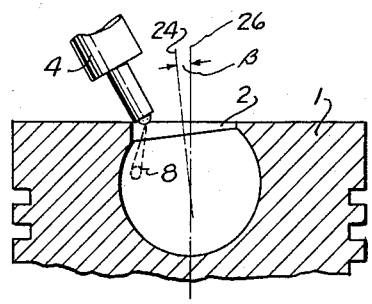
Fig. 11 is a longitudinal cross-sectional view through the axis of the combustion chamber in a piston with a flat top piston head, the axis of the combustion chamber forming an acute angle with the axis of the cylinder.

In Fig. 11, the piston 1 has a flat head surface. The axis 24 of the spherical combustion chamber 2 forms an angle β with the axis 26 of the piston 1 or of the cylinder, respectively. A nozzle 4 in the cylinder head serves to inject the fuel in the form of a single jet having the shape of a hollow cone. The edge of the mouth or opening of the combustion chamber 2 in this case is of a continuous shape, without being cut away for receiving the nozzle.

Figure 12:
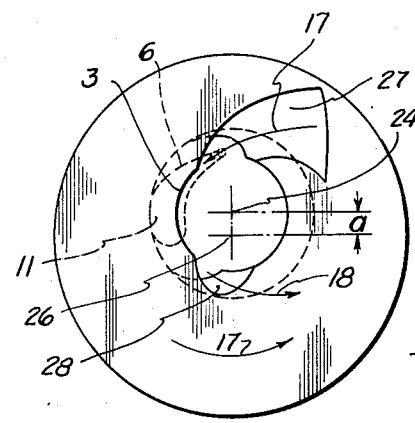
Figs. 12, 13 and 14 are top plan views of the piston exemplifying various arrangements of the intake and exit channels; in this case, the axis of the combustion chamber is displaced in parallel relation to the cylinder axis.

Fig. 12 shows an embodiment in which a tangential channel 27 is provided in the neck 3 of the combustion chamber 2 for feeding air to the fuel jet or jets 6 and to the zone of impact 11 preferably in the direction of the rotation of the air 17, as indicated by the arrows. From the zone of impact 11 of the fuel, the channel 28 permits preferred exit of the partly burnt mixture of fuel and air, as shown by arrow 18. The axis 24 of the combustion chamber 2 is displaced by a distance "a" relative to the axis 26 of the piston.

Figure 13:
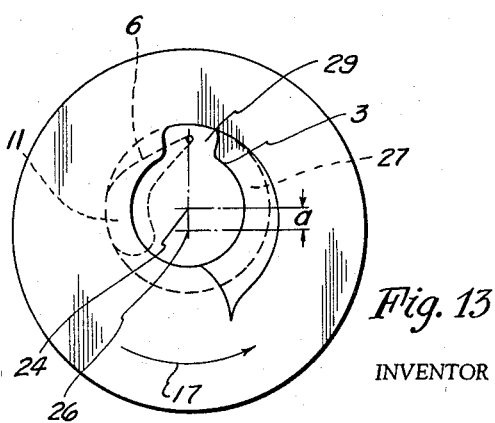

In Fig. 13, the channel 27 extends around the neck 3 of the combustion chamber in the form of a ring. The air enters the combustion chamber through the fuel notch or cutout 29 and flows preferably towards the zone of impact 11. Again, a displacement "a" is provided between the combustion chamber and cylinder axes.

Figure 14:
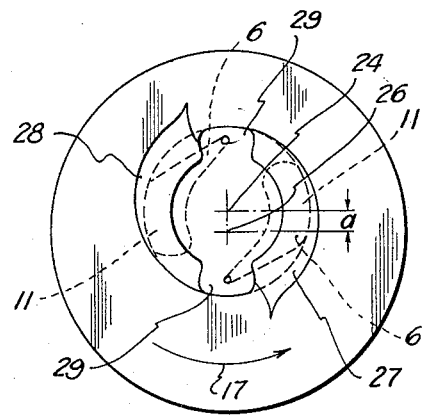

Fig. 14 corresponds to Fig. 13 except that a plurality of channels 27, 28 are directed into the combustion chamber 2, for forming a part of the air displaced into the combustion chamber into several air currents.

It will be understood that in the system according to the present invention, immediate atomizing of the fuel in the air for combustion is intentionally minimized. This can be achieved by the specifically described association between the movement of the air in the combustion chamber and the jets. It is always necessary to provide for a well-defined movement of the air by which the fuel is vaporized and mixed from the zone of impact on the wall of the combustion chamber. This movement of the air is caused by one or both of two measures: by the said rotation of the air for combustion around the axis of the cylinder during the combustion stroke and by the fact that the combustion chamber has a diameter less than the cylinder bore, so that an increase in air swirl velocity is produced as the air flows into the combustion chamber.

By the said parallel movement of the fuel jets and of the air in the same direction, the energy of the rotation of the air about the cylinder axis is added to the energy of the fuel jets. With the conventional direction of the jets perpendicular to the direction of flow of the air the fuel jets formed an arresting surface, so to skeak, for the air eddies, since it was intended to have the fuel atomized by the air. In the system of this invention the contrary is sought. The fuel jet and the air, insofar as a mixture takes place at all in the first phase of the process, are flowing in the same direction. Thus the air and fuel do not undergo any substantial change in their velocity.

Alternatively, as shown in Figures 15 to 20, the novel system according to the invention is used in engines in which the combustion chamber is arranged in the cylinder head. The combustion chamber in this case may take the form of a turbulence chamber obtained by rotation of a curve, or it may take the form of a disk-shaped swirl chamber, and the fuel injected from the injection nozzle onto the wall of the combustion chamber. Accordingly, the rotation of the air may be imparted such a direction and intensity that the atomizing of liquid fuel by the entering air is restricted to the amount required for ignition. Therefore, a spreading of the major portion of the fuel upon the wall of the combustion chamber is ensured, and the air which has been heated during the compression stroke is swept across the fuel on the wall of the combustion chamber, which is then released from said wall in a vaporized condition, mixed with the air, and fed to the combustion reaction.

It is thus seen that the important feature again is the arrangement of the injection nozzle and the position of the fuel jet emitted therefrom, as such arrangement makes it possible to apply the fuel to the wall of the combustion chamber in such a way that it is not scattered or even prevented by the movement of the air.

For example, the turbulence chamber or its neck-shaped transfer passage is arranged so that the air entering through the same into the turbulence chamber in the compression stroke is imparted a rotary movement around the center of the combustion chamber. In this case, according to a further feature of the invention, the injection nozzle is positioned in the combustion chamber on the side of the air transfer passage, at a level above the same. The fuel is applied from the tip of the nozzle directly to the wall of the combustion chamber in the direction of rotation of the air and is located outside of the main turbulence zone in the region where the neck-shaped transfer passage opens into the turbulence chamber.

Figure 15:
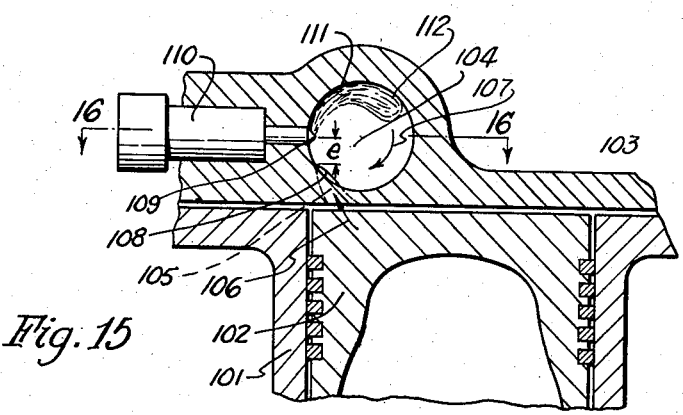
Fig. 15 is a fragmentary cross-sectional view of a diesel engine with a turbulence combustion chamber arranged in the cylinder head, and means for applying the fuel on the wall thereof in accordance with the present invention, the transfer passage being arranged so that the combustion air entering into the turbulence chamber during the compression stroke is imparted a rotary motion.
Figure 16:
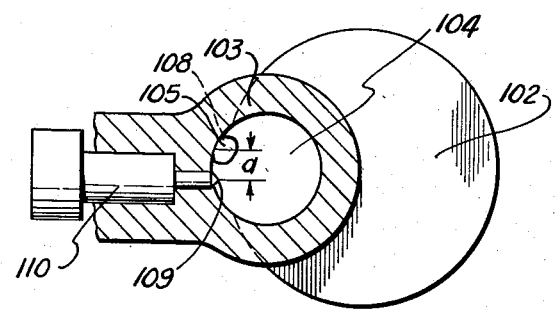
Fig. 16 is a sectional view on line 16—16 of Fig. 15 showing further details in a plan view.

In Fig. 15, the combustion chamber is provided in the cylinder head in the form of a turbulence chamber 104 whose neck-shaped transfer passage 105 is constructed so that the air entering during the compression stroke in the direction of arrow 106 is imparted a rotary or circulating motion in the direction of arrow 107, i.e., around the center of the chamber. Slightly above the air inlet opening 108 of the transfer passage 105, but laterally displaced therefrom by the distance d, Fig. 16, is the tip 109 of the injection nozzle 110 from which the fuel jet 112 is applied to the wall 111 of the chamber 104. The fuel jet 112 is directed so that it does not intersect with the air jet blown in through the air intake opening 108, and therefore the liquid fuel is not prevented from spreading on the wall of the combustion chamber in the form of a film. Instead of injecting the fuel in the form of a single jet 112, several jets may be arranged, provided only that the spreading of the fuel in the form of a film is ensured. While in the hitherto known turbulence chamber engines the direction of the fuel spray injected into the combustion chamber in general has been in the form of a chord or radius, there is now provided a tangential injection along the wall of the combustion chamber in order to prevent as much as possible the mixing of the liquid fuel with the air entering into the combustion chamber. This is preferably effected by displacing the planes of the fuel nozzle 110 or of the mouth 109 of the nozzle and the plane of the air intake opening 108, as seen in Fig. 16.

It will thus be understood that the injection nozzle 110 or its tip 109 are deliberately not arranged in or in front of the transfer passage 105, but at a point of the combustion chamber at which the air jet by its penetration into the turbulence chamber has already expanded towards all sides. The position of the injection nozzle 110 in Fig. 15 is at approximately the minimum permissible vertical distance "e" between nozzle 110 and air intake opening 108, in order to ensure the formation of a film as an intermediate phase in the formation of a mixture.

Figure 17:
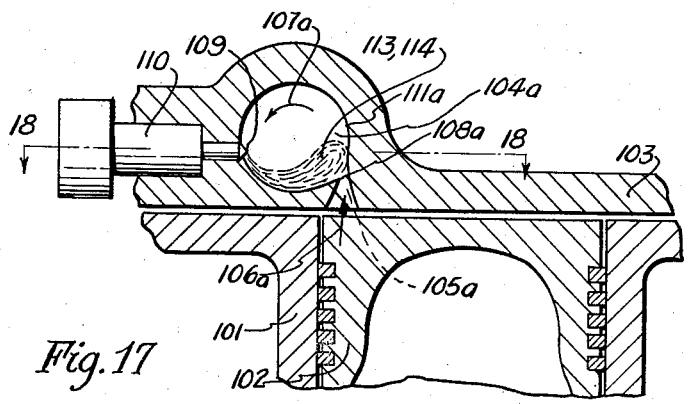
Fig. 17 is a fragmentary longitudinal sectional view similar to Fig. 15, but showing a diesel engine in which the neck-shaped transfer pasage is arranged to give a swirl reversely to Fig. 15.
Figure 18:
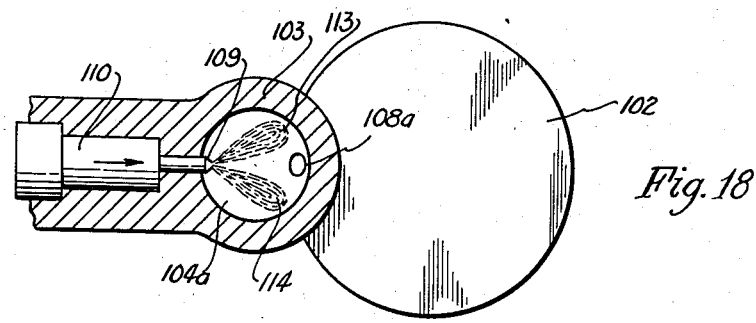
Fig. 18 is a sectional view on a line 18—18 of Fig. 17, showing means for applying the fuel on the wall of the combustion chamber in the form of two jets.

Figs. 17 and 18 show a turbulence chamber 104a whose transfer passage 105a is arranged reversely to Fig. 15, so that the air shooting into the turbulence chamber during the compression stroke is imparted a movement in the direction of the arrows 106a, 107a, i.e. a rotary motion in an outward direction around the center of the combustion chamber. The injection nozzle 110 and the tip 109 of the nozzle in this case are opposite the air intake opening 108a of the transfer passage 105a in the same plane. This arrangement is advisable, for example, where it is required that the injection nozzle is aligned with the diametric axis of the combustion chamber, which in many cases is desirable for constructional reasons. In this arrangement the direct mixing of liquid fuel with the air and the formation of the fuel film on a part 111a of the wall of the wall of the combustion chamber not touched by the air can be achieved by applying the fuel jets 113 and 114 on both sides of the air intake opening 108a and, passing by the same, on the wall 111a of the combustion chamber. The arrangement of the jets resulting in this case is indicated in Fig. 18. In this way, it is ensured that the fuel film is formed in the direct vicinity of the intensively washed air intake opening 108a, while the air jet entering through the opening 108a is unable to entrain the fuel before it is applied on the wall.

The method according to the invention can also be applied successfully in engines having a so-called swirl chamber. Usually, in a swirl chamber, which is in the shape of a disk or cylinder, the injection nozzle or its tip and the air intake opening are in the same plane, as viewed from the main combustion chamber. This means that the fuel is atomized in the air and that a mixture of substantially liquid fuel particles with air is formed with the heretofore described disadvantages.

In order to avoid this atomized fuel-air mixture, according to the present invention, in engines of this type the air intake opening of the neck-shaped transfer passage is laterally displaced in the transverse direction of the combustion chamber, in such a way that the plane of the fuel jet applied on the wall of the combustion chamber from the nozzle tip is located outside of the main turbulence zone at the entrance of the neck-shaped transfer passage into the combustion chamber.

Figure 19:
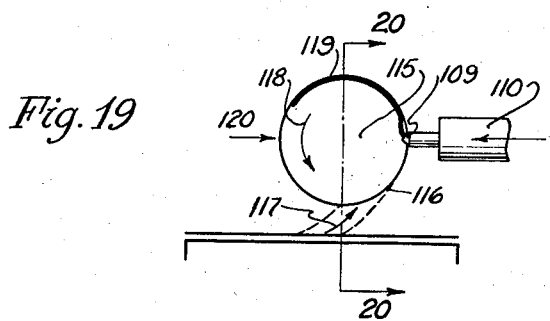
Fig. 19 is a diagrammatic sectional view showing a combustion chamber in the form of a disc-shaped swirl chamber on the wall of which the fuel is applied in accordance with the invention.
Figure 20:
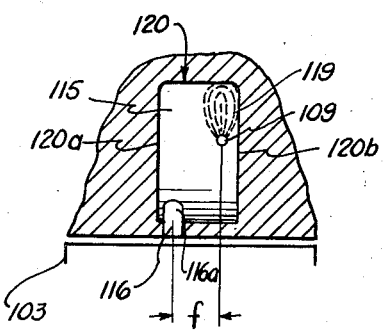
Fig. 20 is a diagrammatic view generally along the longitudinal axis of Fig. 19.

Figs. 19 and 20 show schematically the invention used in a diesel engine having a disk-shaped swirl chamber. In the compression stroke the air is displaced through the transfer passage 116 into the disk-shaped swirl chamber 115 imparting to the air a rotary motion in the direction of the arrows 117, 118. The fuel jet 119 is applied directly to the cylindrical wall 120 of the combustion chamber from the tip 109 of the nozzle 110, and the air shooting into the combustion chamber 115 from the air intake opening 116a of the transfer passage 116 does not interfere with the formation of the fuel film on the wall of the combustion chamber. This is achieved on the one hand by mutually displacing the transfer passage 116 and the tip 109 of the nozzle in the transverse direction of the combustion chamber 115 by a distance "*f*," and on the other hand by directing the fuel jet 119 in such a way that it is swept by the air current issuing from the transfer passage 116 only after the film has been formed. Instead of applying the fuel film on the cylindrical surface 120, Fig. 20, it is also contemplated to apply it on that one of the side walls 120a, 120b of the disk-shaped chamber which is adjacent to the injection nozzle 110. In this way the distance "*f*" between the two vertical planes, in which the air transfer passage 116 and the tip 109 of the nozzle are arranged, is adjusted in a favorable or desirable manner.

While the invention has been described in detail with respect to certain embodiments of the invention it is understood that various changes and modifications may be made without departing from the spirit and scope of the invention as set forth in the appended claims.

This is a continuation-in-part of our patent application Serial No. 325,316, dated December 11, 1952, entitled "Injection System for Internal Combustion Engine," now abandoned.

Having now described the means by which the objects of the invention are obtained, we claim:

1. A method of burning fuel in a compression ignition engine, comprising injecting a compact solid stream of liquid fuel into the engine cylinder near the end of the compression stroke, atomizing a minor portion of the fuel during said injection to form a self-ignitable mixture of air and atomized liquid fuel particles, maintaining the major portion of the injected fuel within the cylinder below the decomposition temperature while vaporizing it without prior atomization, mixing swirling air and vaporized fuel as it continuously vaporizes to form an admixture, and igniting the admixture of vaporized fuel and air by the self-ignition of the minor portion of atomized fuel.

2. A method of burning fuel in a compression ignition solid injection engine, comprising injecting the fuel into a charge of compressed air contained in a combustion space, atomizing only a small portion of the fuel during said injection, mixing the atomized liquid particles with the air of the charge for self-ignition therein, depositing substantially all the balance of the fuel in chemically unchanged form as a film on the wall of the combustion space, maintaining the film below the decomposition temperature of the fuel while vaporizing fuel from the surface of the film, mixing vaporized fuel and swirling air, and igniting the vaporized fuel by the self-ignition of the atomized liquid fuel particles.

3. A method of burning fuel in a compression ignition engine, comprising forming an air swirl in the combustion space of the engine, injecting into the combustion space near the end of the compression stroke a solid stream of liquid fuel directed tangentially of the swirling air, depositing the major portion of the injected fuel on the wall of the combustion space as a film swept by the swirling air, atomizing a minor portion of the fuel during said injection to form a self-ignitable mixture of air and atomized liquid fuel particles, vaporizing fuel progressively from said film into the air sweeping its surface to form an admixture, and igniting such admixture by the self-ignition of the minor portion of atomized fuel.

4. A method of burning fuel in a compression ignition engine, comprising injecting a solid stream of liquid fuel into the engine cylinder near the end of the compression stroke, atomizing a small portion but at least approximately 2 percent of the fuel during said injection to form a self-ignitable mixture of air and atomized liquid fuel particles, maintaining the remainder of the injected fuel within the cylinder below the decomposition temperature while vaporizing it without prior atomization, mixing intake air and vaporized fuel as it continuously vaporizes to form an admixture, and igniting the admixture of vaporized fuel and air by the self-ignition of the atomized fuel.

5. A method of burning the fuel in a compression ignition solid injection engine, comprising the steps of introducing air into the engine cylinder and simultaneously imparting to the introduced air a swirling motion about the axis of the cylinder, compressing such charge into a combustion chamber approximately co-axial with the cylinder and of reduced diameter with respect to the diameter of the cylinder to increase the angular velocity of swirl, and then injecting a jet of the fuel into the combustion chamber generally tangentially in the direction of swirl and from a point close to the point of contact of the jet on the wall of the combustion chamber to atomize a minor portion of the fuel and deposit a major portion of unatomized fuel in the form of a film on the wall of the combustion chamber, and then igniting the fuel vaporized from said film.

6. In a method of burning the fuel in a compression ignition solid injection engine wherein only a part of the fuel is atomized upon injection, the steps of imparting swirling motion to a charge of air by compressing such charge and directing it generally tangentially into a combustion chamber, injecting a jet of the fuel into such chamber generally tangentially in the direction of swirl and generally tangentially to the surface of the combustion chamber and from a point close to the point of contact of the jet on the wall of the combustion chamber to minimize atomization of the fuel and promote deposition of unatomized fuel in the form of a film on the wall of the combustion chamber, maintaining the temperature of the film below that which would result in chemical decomposition of the fuel therein, vaporizing the unatomized fuel of the film into the swirling air, igniting the fuel by the self-ignition of the atomized part of the fuel, and progressively burning the fuel as it is so vaporized.

7. A method of burning fuel in an internal combustion engine comprising injecting a solid stream of liquid fuel into a combustion space having a non-candescent wall and during the end portion only of the compression stroke and the beginning of the power stroke, atomizing a minor portion of the injected fuel during injection, maintaining the major portion of the fuel below the decomposition temperature and progressively vaporizing it without prior atomization, mixing swirling air and vaporized fuel as it vaporizes to form an admixture, and igniting and burning the atomized and vaporized fuel.

8. A method of burning the fuel in an internal combustion engine, comprising the steps of imparting swirling motion to a charge of air when entering the combustion space of the engine, injecting a jet of the fuel near the end of the compression stroke and generally tangentially to the swirl and from a point close to the point of contact of the jet on the wall of the combustion space to minimize atomization of the fuel and promote deposition of unatomized fuel in the form of a film on the wall of the combustion space, progressively vaporizing fuel from said film into the swirling air, igniting the fuel by the self-ignition of the atomized part of the fuel jet, and progressively burning the fuel of the film as it vaporizes.

9. In an internal combustion engine having cylinder and piston structures constructed and arranged to provide a combustion space in which fuel is to be ignited, means for creating swirling movement of air in said combustion space, means including an injection nozzle for injecting liquid fuel into said combustion space, said nozzle atomizing the minor portion of the injected fuel and being oriented to discharge the major portion of the fuel generally tangentially of a wall of said combustion space to form a film of liquid fuel thereon, and said nozzle being positioned a short distance from the point of impingement of the injected fuel on such wall to minimize the atomization of fuel.

10. In an internal combustion engine as in claim 9, said nozzle having orifice means for discharging a plurality of jets of fuel all of which impinge tangentially on said wall over different areas.

11. In an internal combustion engine having cylinder and piston structures constructed and arranged to provide a combustion chamber and a port through which air compressed in the cylinder structure enters the combustion chamber during the compression stroke of the piston, said port being disposed to direct such entering air generally tangentially of said chamber to cause swirling movement of the air therein, means including an injection nozzle for injecting liquid fuel into said combustion chamber late in the compression stroke, said nozzle being oriented to discharge generally tangentially of the air swirl and on to a wall of said combustion chamber to form a film of liquid fuel thereon, and said nozzle being positioned in spaced relation to said port and at a short distance from the point of impingement of the injected fuel on the chamber wall.

12. In an internal combustion engine having cylinder and piston structures, means for introducing air into said cylinder structure and simultaneously imparting to such air a swirling motion about the cylinder axis, one of said structures having a combustion chamber of smaller diameter than the cylinder structure, and communicating therewith through a generally centrally located opening whereby the swirling air, when compressed, will be introduced into the combustion chamber with an accelerated angular velocity of swirl, means including an injection nozzle for injecting liquid fuel into said combustion chamber late in the compression stroke of the piston, said nozzle being oriented to discharge generally tangentially of a peripheral wall of said combustion space to form a film of liquid fuel on a portion of said wall over which the swirling air sweeps with high velocity, said nozzle being positioned at a short distance from the point of impingement of the injected fuel on such wall to minimize the atomization of fuel.

13. In an internal combustion engine as in claim 12, said combustion chamber being in said piston, said cylinder structure having a head provided with an eccentric air inlet port obliquely oriented to direct the air passing through it toward the axis of the cylinder structure, an inlet valve cooperating with said port to control the flow of air therethrough, means for operating said valve, and means providing an intake passage communicating with said port and so formed as to impart swirling movement of the supplied air.

14. In an internal combustion engine as in claim 13, said valve comprising an inwardly opening poppet valve, said valve operating means opening said valve to an extent such that the area of the annular opening between the valve and the edge of the port is greater than the effective area of the port.

15. In an internal combustion engine having a cylinder and a piston, means for introducing air into said cylinder and simultaneously imparting to such air a swirling motion about the cylinder axis, said piston having a combustion chamber of smaller diameter than the cylinder and communicating therewith through a generally centrally located opening whereby the swirling air, when compressed, will be introduced into the combustion chamber with an accelerated angular velocity of swirl, said piston being provided with a spiral channel for directing the compressed air entering the combustion chamber toward a portion of the wall of the combustion chamber, and means including an injection nozzle for injecting liquid fuel into said combustion chamber, said nozzle being oriented to atomize a minor portion of the fuel in said combustion chamber and to direct the major portion of the fuel in the direction of the air swirled through said channel and onto said portion of the wall of said combustion chamber.

16. In an internal combustion engine as in claim 12, said combustion chamber being provided in said piston structure, the axis of said chamber being inclined toward said injection nozzle at an acute angle to the axis of the cylinder structure.

17. A method of burning the fuel in a compression ignition solid injection engine, comprising the steps of introducing air into the engine cylinder and simultaneously imparting to the introduced air a swirling motion about the axis of the cylinder, compressing the swirling air into a combustion chamber approximately coaxial with the cylinder and of reduced diameter with respect to the diameter of the cylinder to increase the angular velocity of swirl in the same direction, and then injecting a compact solid stream of the liquid fuel upon the wall of the combustion chamber generally tangentially to and in the direction of swirl and from a point close to the point of contact of the jet on said wall to minimize atomization of the fuel and promote deposition of liquid fuel on the wall of the combustion chamber, maintaining the temperature of the fuel below that which would result in chemical decomposition of the fuel therein, vaporizing the unatomized fuel into the swirling air, and progressively burning the fuel as it is so vaporized.

18. A method of burning the fuel in an internal combustion engine, comprising the steps of imparting swirling motion to a charge of air while compressing the air into a swirl chamber through a channel merging tangentially with the wall of said chamber, injecting a jet of the fuel into the compressed air near the end of the compression stroke in the direction of air motion and generally tangentially to the wall of that chamber and from a point close to the point of contract of the jet on the wall of the swirl chamber, whereby to minimize atomization of the fuel and promote deposition of unatomized fuel on the wall of the swirl chamber, such point of contact of the fuel jet on the wall of the combustion chamber lying in a region where the swirling air has a great velocity, progressively vaporizing fuel from said wall by the swirling air, and progressively burning the fuel as it vaporizes.

19. A method of burning fuel in an internal combustion engine having a cylinder and a combustion space associated therewith, comprising imparting a swirling motion in one direction to the intake air during the compression stroke, injecting a stream of fuel into said space near top dead center of the compression stroke in substantially the same direction as said air swirl and with the major portion of the fuel being deposited on the wall of the combustion space as a non-vaporized film and a minor portion of the fuel atomized in said air swirl, igniting said minor portion of the fuel at approximately the top dead center of the compression stroke, continuing the air swirl in the same direction during the power stroke and progressively vaporizing the fuel from said film during the power stroke, and igniting and burning the vaporized fuel from the previously ignited fuel as it is progressively vaporized during the power stroke.

20. In an internal combustion engine having cylinder and piston structures constructed and arranged to provide a combustion space in which fuel is to be ignited, means for creating a swirling movement of the intake air in one direction in the cylinder during the piston compression stroke, channel means in one of said structures for continuing the air swirl in the same one direction and at an increased velocity within said combustion space during the end of the compression stroke and the beginning of the combustion stroke, and nozzle means for injecting liquid fuel generally tangentially of wall of said combustion space to form a film of liquid fuel thereon with a minor portion of the fuel being directly atomized in the swirling air.

21. In an engine as in claim 20, said means for creating a swirling air movement in said cylinder comprising a spiral-shaped air intake channel communicating with said cylinder.

22. In an engine as in claim 20, said combustion space being formed in said piston and having its axis inclined with respect to the longitudinal axis of said piston.

23. In an engine as in claim 20, said combustion space being formed in said piston, said channel means comprising an inlet channel in the surface of the piston head and extending tangentially into said combustion space adjacent the film of fuel formed on the combustion space wall and in the direction of the air swirl, and an exhaust channel opposite said inlet channel.

24. In an engine as in claim 20, said combustion space being formed in said piston, and said channel means comprising a ring-like channel formed in the wall of the combustion space.

25. In an engine as in claim 24, further comprising a plurality of ring-like channels.

26. A method of burning the fuel in an internal combustion engine, comprising the steps of imparting swirling motion to a charge of air when entering the combustion space of the engine, injecting a jet of the fuel near the end of the compression stroke and generally tangentially to the swirl and from a point close to the point of contact of the jet on the wall of the combustion space to minimize atomization of the fuel and promote deposition of unatomized fuel in the form of a film on the wall of the combustion space, progressively vaporizing fuel from said film by the outer circumferential portion of the air swirl, igniting the fuel by the ignition of the atomized part of the fuel jet, and progressively burning the fuel of the film as it vaporizes.

27. In an internal combustion engine having cylinder and piston structures constructed and arranged to provide a combustion chamber and a port through which air compressed in the cylinder structure enters the combustion chamber during the compression stroke of the piston, said port being disposed to direct such entering air generally tangentially of said chamber to cause swirling movement of the air therein, means including an injection nozzle for injecting liquid fuel into said combustion chamber late in the compression stroke, said nozzle being oriented to discharge generally tangentially of the circumferential portion of the air swirl having a high velocity and onto a wall of said combustion chamber to form a film of liquid fuel thereon, and said nozzle being positioned in spaced relation to said port and at a short distance from the point of impingement of the injected fuel on the chamber wall.

References Cited in the file of this patent

UNITED STATES PATENTS

| | | |
|---|---|---|
| 1,970,866 | Reed | Aug. 21, 1934 |
| 2,808,036 | Von Seggern et al. | Oct. 1, 1957 |
| 2,808,037 | Von Seggern et al. | Oct. 1, 1957 |

FOREIGN PATENTS

| | | |
|---|---|---|
| 221,356 | Germany | April 28, 1910 |
| 394,403 | Great Britain | June 29, 1933 |
| 404,030 | Great Britain | Jan. 8, 1914 |
| 643,351 | Great Britain | Sept. 20, 1950 |
| 870,277 | France | Dec. 5, 1941 |